United States Patent
Ono

(10) Patent No.: US 8,077,600 B2
(45) Date of Patent: Dec. 13, 2011

(54) MOBILE COMMUNICATION SYSTEM

(75) Inventor: Mitsuhiro Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 12/427,135

(22) Filed: Apr. 21, 2009

(65) Prior Publication Data

US 2009/0201801 A1 Aug. 13, 2009

Related U.S. Application Data

(63) Continuation of application No. PCT/JP2006/321072, filed on Oct. 23, 2006.

(51) Int. Cl.
*G01R 31/08* (2006.01)
*H04B 7/208* (2006.01)
*H04B 7/185* (2006.01)

(52) U.S. Cl. .......... 370/216; 370/344; 370/318

(58) Field of Classification Search .......... 370/216, 370/218, 221, 242, 250, 251, 252, 329, 341, 370/344; 455/403, 422.1, 423, 443, 446, 455/450, 452.1, 453
See application file for complete search history.

(56) References Cited

U.S. PATENT DOCUMENTS

| | | | |
|---|---|---|---|
| 6,587,686 B1 * | 7/2003 | Cuffaro et al. | 455/423 |
| 6,907,237 B1 * | 6/2005 | Dorenbosch et al. | 455/404.1 |
| 7,764,662 B2 * | 7/2010 | Oh et al. | 370/343 |
| 7,826,820 B2 * | 11/2010 | Bjork et al. | 455/403 |

FOREIGN PATENT DOCUMENTS

| | | |
|---|---|---|
| EP | 1605619 A1 | 12/2005 |
| JP | 04336822 | 11/1992 |
| JP | 6104820 | 4/1994 |
| JP | 07193856 | 7/1995 |
| JP | 2002044002 | 2/2002 |
| WO | 2004077712 | 9/2004 |

OTHER PUBLICATIONS

International Search Report dated Feb. 6, 2007.

* cited by examiner

*Primary Examiner* — Hanh Nguyen
(74) *Attorney, Agent, or Firm* — Murphy & King, P.C.

(57) ABSTRACT

To provide a method and an apparatus for achieving a cell redundancy. Base stations, to which different frequency bands are assigned, have active base-station transmitter-receivers with a predetermined number of wireless zones repeated. Some base stations also have standby base-station transmitter-receivers at the rate of one in every predetermined number of sites that have the predetermined number of wireless zones. Under a normal condition, the different frequency bands, which are obtained by dividing a predetermined frequency bandwidth by the predetermined number of the wireless zones, are established at the respective base stations in the respective wireless zones. Under a troublesome condition, different frequency bands, which are obtained by dividing the predetermined frequency bandwidth by the predetermined number of the wireless zones plus the predetermined number of the sites, are assigned to base stations in the respective wireless zones and to base stations that are positioned on the periphery of a wireless zone where the trouble has occurred and that have the standby base-station transmitter-receivers. Further, the output powers of the standby base-station transmitter-receivers of the base stations, which are positioned on the periphery of the wireless zone where the trouble has occurred, are adjusted such that the output powers are overlaid on the wireless zone where the trouble has occurred.

6 Claims, 19 Drawing Sheets

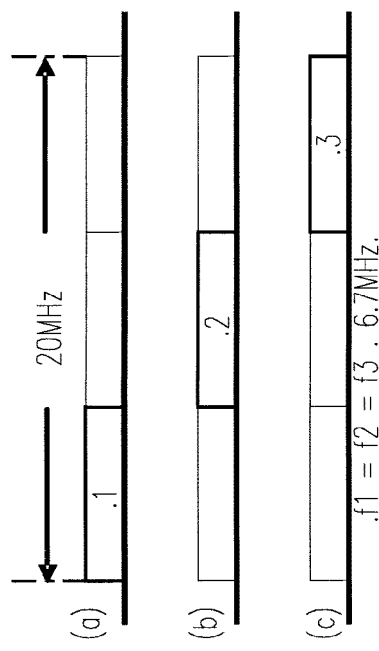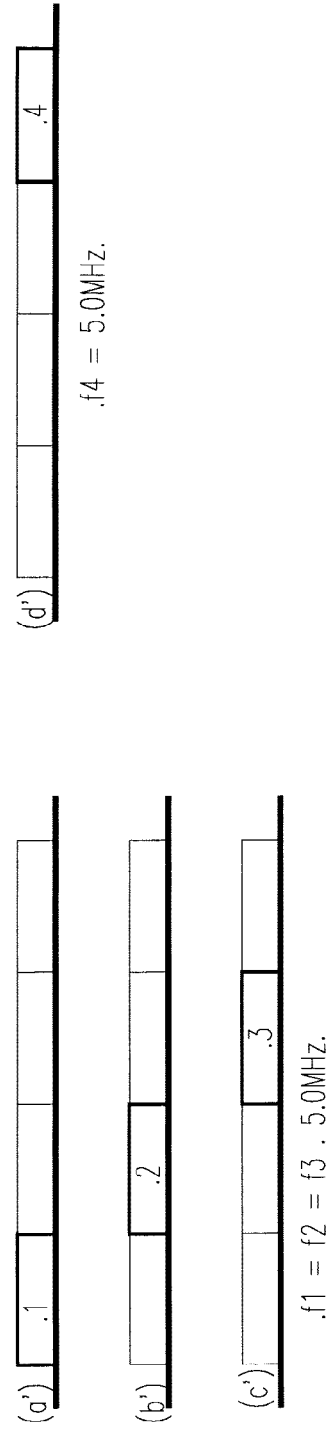
FIG. 16A
FIG. 16B

MOBILE COMMUNICATION SYSTEM

CROSS REFERENCE TO RELATED APPLICATIONS

This application is a continuation of International Application No. PCT/JP2006/321072, filed on Oct. 23, 2006, now pending, herein incorporated by reference.

FIELD AND BACKGROUND

The present invention relates to a mobile communication system.

In a mobile communication system, communication for line connection is performed between a radio base station and a terminal. At this time, it is desirable that the radio base station has large coverage (communication range) and high throughput (communication speed) in terms of efficiency and quality of communication.

A method employed to implement this demand is to increase the output power of the radio base station in a downlink from the radio base station to the terminal. Increasing the output power increases the power consumption, so a device which consumes power as low as possible tends to be used.

Regarding the installation of the radio base station, on the other hand, a compact and light weight radio device is required. In some cases, for this a device in which a redundant configuration of an internal panel of the device is omitted may be used. Communication equipment, however, must have a redundant configuration to effectively be used even in such emergencies as a disaster.

In such a case, a cell redundant configuration may be used. However, if a cell redundant configuration is used, deterioration of connection quality and deterioration of throughput (degenerated operation), which never occurs in a redundant configuration of the internal panel of the device, may occur.

Hence various cell redundancy methods which minimize such deterioration of connection quality and deterioration of throughput have been considered.

An example is the invention according to Patent Document 1. The invention of Patent Document 1 is a code division multiple access (CDMA) system, wherein a frequency band to be used is divided into a plurality of bands, a cluster is constructed by a number of cells which are the same as the number of the division, and interference from adjacent cells is eliminated using this cluster as a unit of using a surface repeat of the frequency, whereby processing for control can also be decreased.

Decreasing interferences from adjacent cells by performing zone repeat is a generally known technology. The invention according to Patent Document 1 is characterized in that this generally known technology is applied to the CDMA system.

Another known technology is an invention according to Patent Document 2. In this invention, an applicable area is covered by a large zone, and if a high traffic area exists in this large zone, the radio base station is disposed so that the small zone of the high traffic area is covered (overlaid).

At this time, it is assumed that the frequency allocated to the large zone is fa, and the frequency band allocated to the small zone is fb, and these frequency bands are divided, for example, into 12 (fa1 to fa12, fb1 to fb12) respectively. In the large zone, fa1 to fa12 are used repeatedly every 12 cells, and in the small zone, fb1 to fb12 are used repeatedly every 12 cells. If the entire applicable area consists of only small zones, the number of radio base stations to be required increases, and if the entire applicable area consists of only large zones, reallocation of the frequency band must be considered, and service must be stopped for a long time when radio base stations are added.

Therefore the invention according to Patent Document 2 is not characterized simply by way of repeating zones, but by way of a cell redundancy configuration.

Patent Document 1: Japanese Laid-open Patent Publication No. H6-104820

Patent Document 2: Japanese Laid-open Patent Publication No. H4-336822

SUMMARY

The present invention provides a method and device for cell redundancy based on a perspective different from the inventions disclosed in the above Patent Documents 1 and 2.

BACKGROUND

With the foregoing in view, it is an object of the present invention to provide a method and a device for cell redundancy which uses the concept of a large zone and a small zone disclosed in Patent Document 2, but provides a large frequency band without dividing the frequency provided in the large zone into the number of zones when a failure occurs to the device.

To achieve the above-described object, a first aspect of the present invention is for providing a radio communication system, characterized in that a radio base station having active radio base stations to which different frequency bands are allocated is located repeatedly every predetermined number of radio zones, a backup radio base station is disposed in the radio base station in one out of a predetermined number of sites having the predetermined number of radio zones, in normal operation, different frequency bands generated by dividing a predetermined frequency bandwidth by the predetermined number of radio zones are set for each of the radio base stations in the radio zone, and when a failure occurs, different frequency bands generated by dividing the predetermined frequency bandwidth by a total number of the predetermined number of radio zones and the predetermined number of sites, are allocated to radio base stations in the radio zone and radio base stations which are located around a failed radio zone and in which the backup radio base station is disposed, and the output power of the backup radio base station of the radio base station located around the failed radio zone is adjusted so as to overlay the failed radio zone.

To achieve the above-described object, a second aspect of the present invention is for providing a radio communication system, characterized in that a radio base station having active radio base stations to which different frequency bands are allocated is located repeatedly every predetermined number of radio zones, a backup radio base station is disposed in the radio base station in one out of a predetermined number of sites having the predetermined number of radio zones, in normal operation, different frequency bands generated by dividing a predetermined frequency bandwidth by the predetermined number of radio zones are set for each of the radio base stations in the radio zone, and when a failure occurs, different frequency bands generated by dividing the predetermined frequency bandwidth by the predetermined number of radio zones plus one are allocated to radio base stations in the radio zone and one or two radio base stations adjacent to a failed radio zone, and the output power of the backup radio base station of the one or two radio base stations adjacent to the failed radio zone is adjusted so as to overlay the failed radio zone.

To achieve the above-described object, a third aspect of the present invention is for providing a radio communication system, including a plurality of radio base stations each of which has a predetermined number of sectors and is disposed so that a radio zone of each sector does not overlap, characterized in that each of the plurality of radio base stations further comprises an active radio base station and a backup radio base station, in normal operation, different frequency bands generated by dividing a predetermined frequency bandwidth by the predetermined number of sectors are set for each of the predetermined number of sectors, when a failure occurs, different frequency band generated by dividing the predetermined frequency bandwidth by a total number of the predetermined number of sectors and the predetermined number of the plurality of radio base stations are allocated to the predetermined number of sectors and a radio base station having a failed sector, and the output power of the backup radio base station of the radio base station having the failed sector is adjusted so as to overlay the radio zone of the failed sector.

Also, to achieve the above-described object, a fourth aspect of the present invention is for providing a radio communication system, comprising a plurality of radio base stations each of which has a predetermined number of sectors and is disposed so that a radio zone of each sector does not overlap, characterized in that each of the plurality of radio base stations further comprises an active radio base station and a backup radio base station, in normal operation, different frequency bands generated by dividing a predetermined frequency bandwidth by the predetermined number of sectors are set for each of the predetermined number of sectors, when a failure occurs, different frequency bands generated by dividing the predetermined frequency bandwidth by a total number of the predetermined number of sectors plus one are allocated to the predetermined number of sectors and a radio base station having a failed sector, and the output power of the backup radio base station of the radio base station having the failed sector is adjusted so as to overlay the radio zone of the failed sector.

Also, to achieve the above-describe object, a fifth aspect of the present invention is for providing a radio communication system, including a plurality of radio base stations each of which has a predetermined number of sectors and is disposed so that a radio zone of each sector does not overlap, characterized in that each of the plurality of radio base stations further comprises an active radio base station and a backup radio base station, in normal operation, different frequency bands generated by dividing a predetermined frequency bandwidth by the predetermined number of sectors are set for each of the predetermined number of sectors, and when a failure occurs, the output power of the backup radio base station of a radio base station corresponding to a sector adjacent to a failed sector is adjusted so as to overlay the failed sector.

Also, to achieve the above-described object, a sixth aspect of the present invention is providing for a radio base station of a plurality of radio base stations which perform radio communication using frequencies not mutually overlapping and belonging to a certain frequency band, and are disposed in a radio communication system having a radio base station group constituting radio areas adjacent to each other, including: a radio unit in which when a frequency band which is not used for the plurality of radio base stations belonging to the radio base station group is increased in the certain frequency band due to a decrease of frequency bands used by one or a plurality of radio base stations out of the radio base stations, the use of the frequency band belonging to the increased frequency band is started after degeneration, and radio communication is performed in the radio communication system.

Also, to achieve the above-described object, a seventh aspect of the present invention is providing for a radio base station, out of a plurality of radio base stations which constitute a radio area respectively, including: a radio unit in which in a first mode, radio communication is performed with a radio terminal in a first radio area using a first partial frequency band selected from a certain frequency band, and in a second mode, radio communication is performed with a radio terminal in a second radio area using a second partial frequency band selected from the certain frequency band, and radio communication is performed with a radio terminal in a third radio area using a third partial frequency band which is different from the second partial frequency band, out of the certain frequency band, and the second partial frequency band is narrower than the first partial frequency band, and the third radio area is a radio area which includes at least the outside of the second radio area.

Because of the above mentioned characteristics of the present invention, even if one radio base station fails, a communicable area range (coverage) can be interpolated by a station overlaying the communication range. Therefore system redundancy can be implemented without major investment.

BRIEF DESCRIPTION OF DRAWINGS

FIG. 16A is a diagram illustrating a frequency allocation in normal operation according to the fourth embodiment.

FIG. 16B is a diagram illustrating frequency allocation in the case where frequencies are allocated to the overlaying station, if a station fail, in the third embodiment;

DESCRIPTION OF EMBODIMENTS

Embodiments will now be described with reference to the drawings.

Here a network to which embodiments are applied will be described in comparison with a conventional network configuration in order to understand the embodiment.

Figure 1:
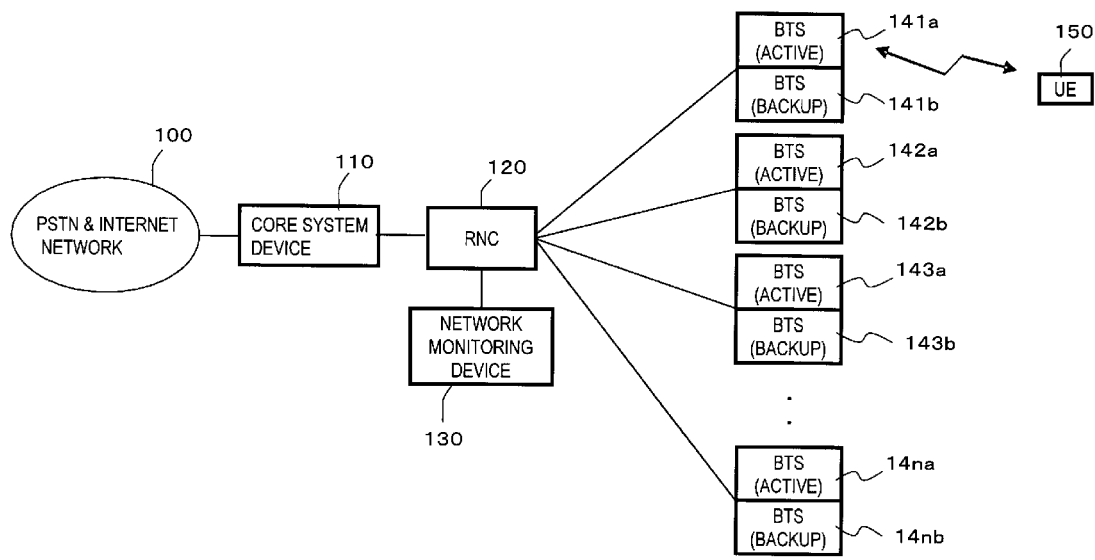
FIG. 1 is a diagram illustrating a network configuration example of an IMT 2000 system.
Figure 2:
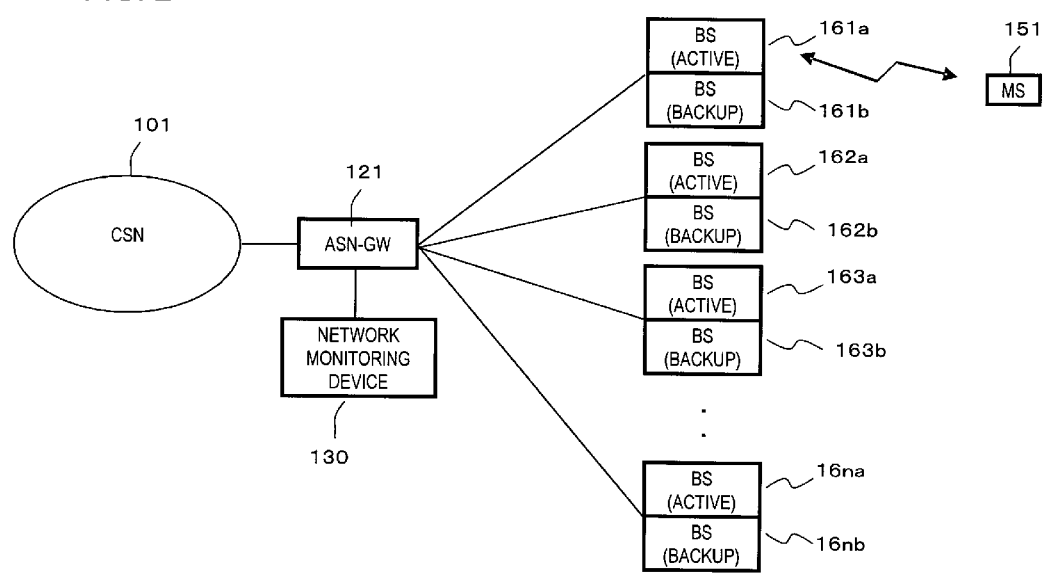
FIG. 2 is a diagram illustrating a network configuration example of a WiMAX (Worldwide Interoperability for Microwave Access) system.

FIG. 1 and FIG. 2 are diagrams illustrating conventional network configuration examples. FIG. 1 is a diagram illustrating a network configuration example of an IMT 2000 system. A radio network controller (RNC) 120 is connected to such a network 100 as a public switched network and the Internet, via core system device 110.

A network monitoring device 130 is attached to the radio network controller 120.

A plurality of n sets of radio base stations (BTS) 141a/141b to 14na/14nb, comprised of an active and backup radio base station respectively, are connected to the radio network controller 120. User equipment 150 communicates with a radio base station in a radio area where the user equipment 150 is located.

The network monitoring device 130 monitors network failures, and the active/backup radio base station is switched.

FIG. 2 is a diagram illustrating a network configuration example of a WiMAX (Worldwide Interoperability for Microwave Access) system. A plurality of n sets of radio base stations (BS) 161a/161b to 16na/16nb, comprised of an active and backup radio base station respectively, are connected to a connection service network (CSN) 101 via an access service network (ASN) 121 to be a gateway (GW). Just like the network configuration in FIG. 1, a network monitoring device 130 is attached to the access service network 121, and the network monitoring device 130 monitors network failures, and the active/backup radio base station is switched.

A mobile station (MS) or user equipment 151 is radio-connected to a radio base station which is in the area where the mobile station is located, and which is currently in operation.

Figure 3:
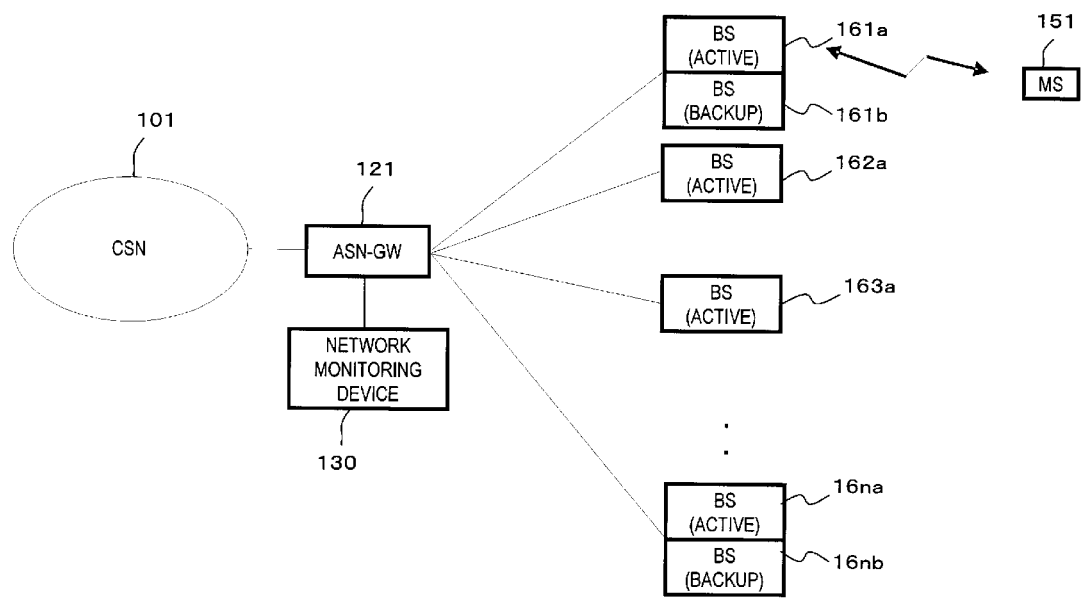
FIG. 3 is a diagram illustrating a network configuration example to which the present invention is applied.

FIG. 3 is a diagram illustrating a network configuration example to which the embodiment is applied, and essentially corresponds to the network configuration of the WiMAX system shown in FIG. 2, but a difference is that a ratio of a backup device of the radio base station (hereafter "backup radio base station", to differentiate it from an active radio base station) and the active base station is not one-to-one but one backup radio base station disposed for a plurality of radio base stations. In FIG. 3, the radio base stations 161a/161b and 16na/16nb are active/backup radio base stations.

Figure 4A:
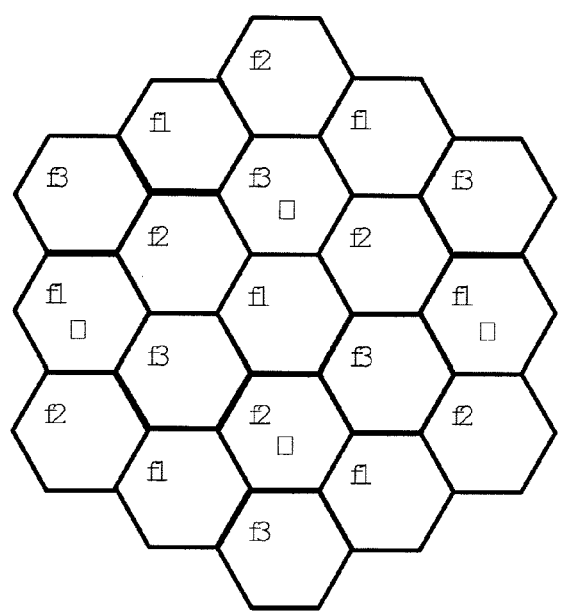
FIG. 4A is a diagram illustrating small radio zones in the frequency allocation of the WiMAX system.
Figure 4B:
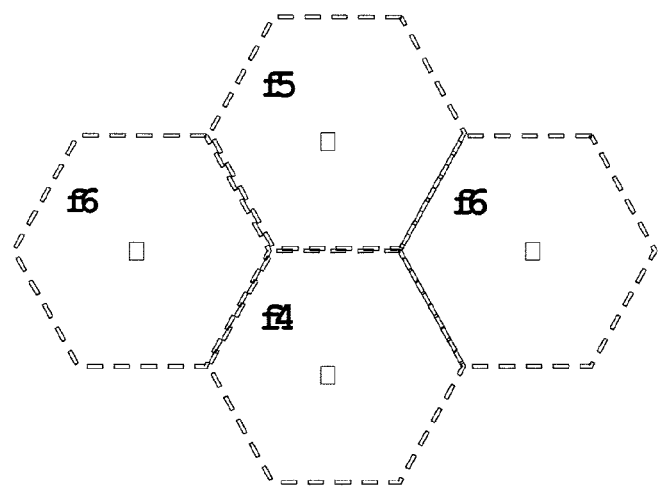
FIG. 4B is a diagram illustrating large radio zones in the frequency allocation of the WiMAX system.
Figure 4C:
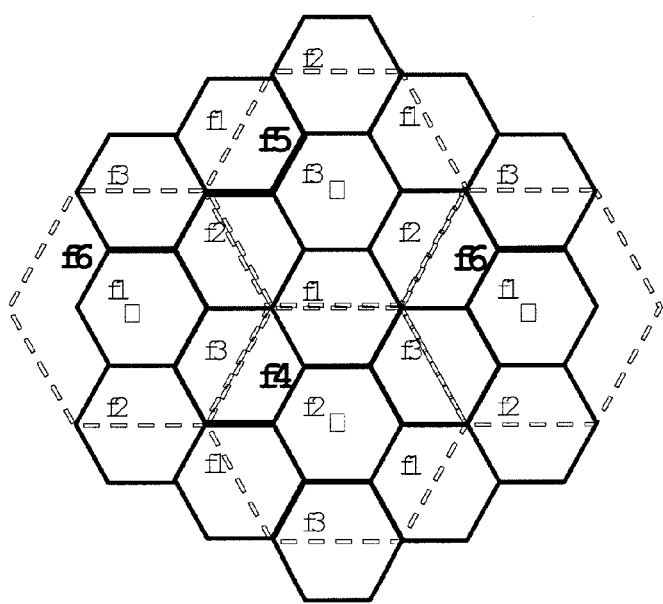
FIG. 4C is a diagram illustrating overlaying of the communicable range by large radio zones in the frequency allocation of the WiMAX system.

FIG. 4A, FIG. 4B and FIG. 4C are diagrams illustrating frequency allocation in the WiMAX system, and specifically, FIG. 4A is a diagram illustrating small radio zones in the frequency allocation of the WiMAX system, FIG. 4B is a diagram illustrating large radio zones in the frequency allocation of the WiMAX system, and FIG. 4C is a diagram illustrating overlaying of the communicable range by large radio zones in the frequency allocation of the WiMAX system.

As a WiMAX system, a number of frequency bands which are less than the number of active radio base stations n, such as three frequency bands f1, f2 and f3, are allocated to a plurality of active radio base stations 161a, 162a, 163a . . . 16na respectively, so that adjacent radio base stations do not share a same frequency band, as shown in FIG. 4A. In other words, a radio area is formed by a plurality of radio base stations which are adjacent to each other and which perform radio communication using frequencies which do not overlap.

Figure 5:
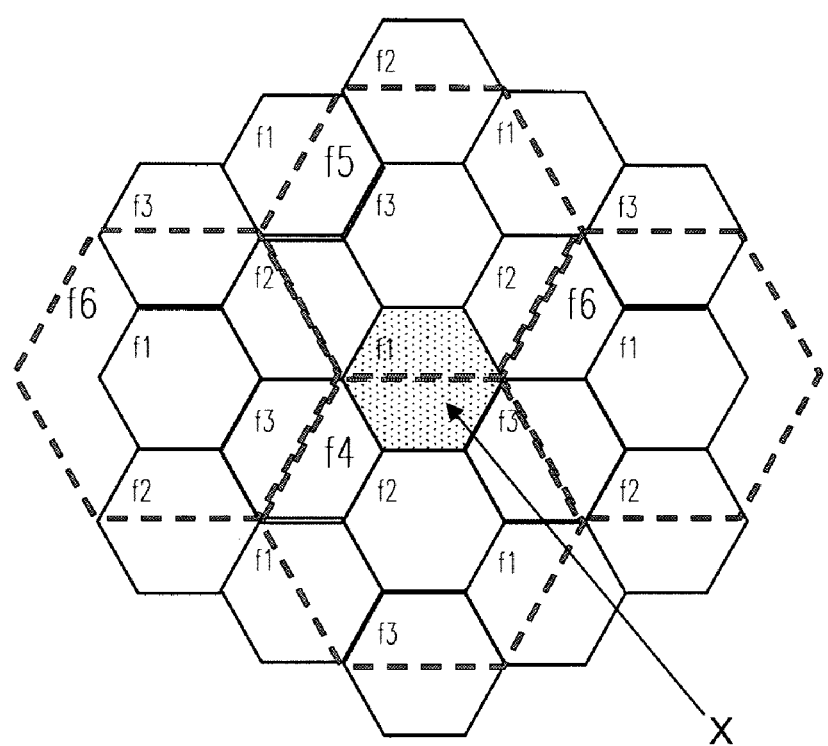
FIG. 5 is a diagram illustrating a concept of station disposition according to the first embodiment.

FIG. 5 is a diagram illustrating a concept of station disposition according to the first embodiment. In FIG. 5, if it is detected that an active radio base station corresponding to a small radio zone X failed, the network monitoring device 130 searches a radio base station corresponding to a large zone, which covers the small zone of this active radio base station with reference to a table. One radio base station corresponding to one large zone is disposed every four sites (radio base station positions). This disposition, one station per four sites, is an example, and one station may be disposed per six sites or nine sites, for example. This is the same for other embodiments herein below.

It is preferable that one radio base station has both the function of a base station for a large zone and the function of a base station for a small zone. Another concept is that a base station for a large zone and a base station for s small zone are disposed as separate base stations.

In the example shown in FIG. 5, the small zone X of the failed active radio base station can be covered by the backup radio base stations corresponding to the large zones A and B.

As a premise of the embodiment, a frequency zone for a large zone area is allocated to the active and backup radio base stations (hereafter a station having the backup radio base station is called an "omni station"), as shown in FIG. 4B. In the example of FIG. 4A and FIG. 4B, the omni stations are radio stations corresponding to the large zones A, B, C and D, and the frequency bands f4, f5 and f6 are allocated to the backup radio stations of the respective omni stations, as the frequency bands of the large zone areas so as not to overlap between adjacent omni stations.

Thereby, as shown in FIG. 4C, allocation of the small zones for the active radio base stations and allocation of the large zones for the omni stations overlap (overlaid). This information on the allocation of the small zones and allocation of the large zones is held by the network monitoring device 130 in a table.

Figure 6A:
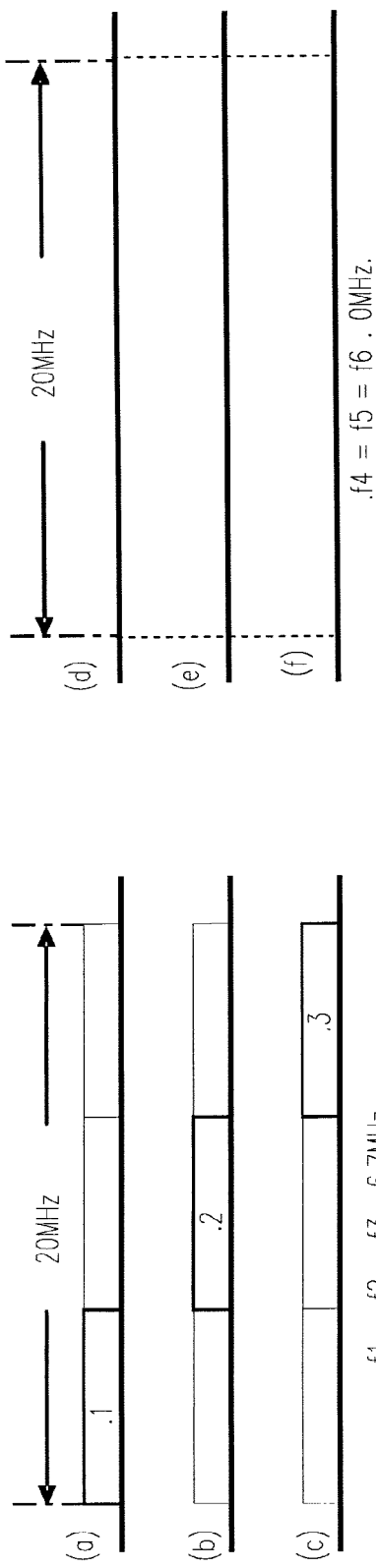
FIG. 6A is a diagram illustrating the frequency allocation when the communication system is operating normally.
Figure 6B:
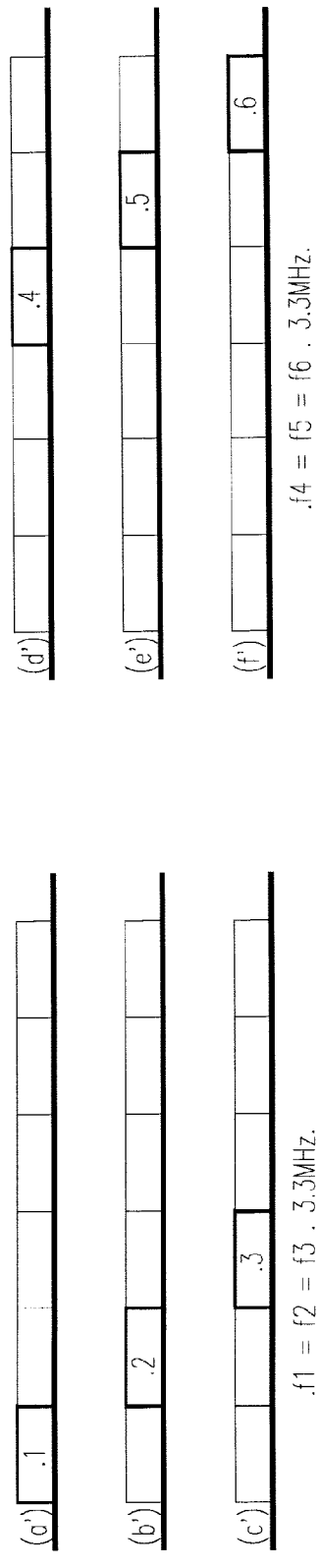
FIG. 6B is a diagram illustrating the frequency allocations in the case of recovering one of the active radio base stations which failed.

FIG. 6A and FIG. 6B are diagrams illustrating the frequency allocation according to the first embodiment.

As described in FIG. 4A to FIG. 4C, it is assumed that the frequency bands f1, f2 and f3 are allocated to the active radio stations, and the frequency bands f4, f5 and f6 are allocated to the backup radio base stations omni stations.

FIG. 6A is a diagram illustrating the frequency allocation when the communication system is operating normally, and FIG. 6B is a diagram illustrating the frequency allocations in the case of recovering one of the active radio base stations which failed.

In the WiMAX system, a 20 MHz band is used, and the total output power thereof is 20 W.

This 20 MHz band is divided into a plurality of frequency bands for use. So as FIG. 6A shows, if the communication system is running normally, the frequency bands are not allocated to the backup radio base stations of the omni stations (FIG. 6A, (d), (e), (f)), and band f1=f2=f3≈6.7 MHz (20 MHz/3) is repeatedly allocated to the active radio base stations (FIG. 6A, (a), (b), (c)).

In this normal state, if the network monitoring device 130 detects a failure in one of the active radio base stations, the frequency allocation in abnormal time is set, as shown in FIG. 6B, via the access service network 121.

In other words, as described above, the network monitoring device 130 has the frequency allocation table on frequency bands allocated to the active radio base stations and backup radio base stations. Therefore an omni station having a backup radio base station, corresponding to a large zone which covers the small zone which belongs to the failed active radio base station, can be specified.

FIG. 6B is a diagram illustrating an example of frequency allocation which was switched to recover a failure.

In other words, the frequency bands f4, f5 and f6 must be allocated to the backup radio base stations of the omni stations, so the 20 MHz frequency band is divided into six frequency bands, f1, f2, f3, f4, f5 and f6 (FIG. 6B, (a'), (b'), (c'), (d'), (e'), (f')), that is about a 3.3 MHz band respectively.

Frequency allocation to the active radio base stations other than the omni stations remain the same as FIG. 6A, and the respective band is 6.7 MHz.

In this way, according to the present invention, frequencies to overlay are allocated only when a failure occurs to a radio base station. Therefore it is unnecessary to secure frequencies in normal operation, and frequency utilization efficiency can be improved.

In other words, when a station fails, frequencies f4 to f6 are allocated to the overlaying stations (omni stations). Normally 6.7 MHz (=20 MHz/3) is allocated to the frequency bands f1 to f3, and when a failure occurs, 3.3 MHz is allocated to the frequency bands f1 to f3 for only corresponding cells, and 3.3 MHz is also allocated to the frequency bands f4 to f6 of the overlaying omni stations.

Therefore a frequency band that can be used by one radio base station is about 4.1 MHz≈(3.3+3.3/4), and efficiency in normal operation is 1.63 times (≈6.7/4.1) better.

In the example shown in FIG. 5, it is controlled to output the signals of the frequency bands f4 and f5 allocated by the corresponding omni stations such that the small zone X, which is originally covered by the failed active radio base station, is covered by the large zones A and B.

In other words, if a failure occurs, signals of the overlaying stations can also be received. If a terminal (mobile station) located in this area requests a connection, the connection request is transmitted to an overlaying station having high reception power using a frequency of this overlaying station (even if this signal is transmitted, interference does not occur, since a frequency different from the frequencies of a base station of a small cell, which is operating normally, is used).

Normally a terminal in this area cannot communicate with the overlaying station. This is because the frequency is prepared for a terminal in an area of a failed station. Therefore if the overlaying station is accessed, the accessing terminal is instructed to check whether another frequency can be used. The instructed terminal searches whether another frequency can be received.

It is the signal from the overlaying station that can be received very strongly, but a signal that can be received at the next strength is the frequency from a normal base station, so the terminal supplements this base station and sends the access request again. This access request is of course received by the normal base station. Thereby a mobile station MS located in a normal small zone adjacent to a failed zone continues communication in this state in this adjacent small zone.

A mobile station MS located in the failed small zone continues communication as a mobile station MS located in a large zone using the corresponding signal of frequency band f4 or f5. In other words, the terminal which supplemented a frequency the same as the previous one as a result of a search sends the access request again. At this time, it is notified that this is the second access. As a result, the overlaying stations can recognize that this terminal is a terminal located in the failed station, and starts allocating a resource. Thereby the station can continue communication as a mobile station MS located in the large zone.

In both of the above cases, the same operation is performed to register a position.

As described above, according to the present invention, new radio communication can be started using the limited frequency bands effectively.

As an embodiment, it was described that a backup radio base station is disposed separate from an active radio base station, but a separate radio base station need not be disposed if the frequency band is reallocated.

For example, it is assumed that the frequency bands used by one or a plurality of radio base stations, out of a plurality of radio base stations which perform radio communication using frequencies which belong to a certain frequency band and do not overlap with each other, degenerate, and the frequency bands which are not used for the plurality of radio base stations belonging to the above mentioned radio base station group is heightened due to failure in this certain frequency band. In this case, the frequency bands belonging to the increased frequency bands are started to be used after degenerating, and radio communication is performed. The timing of this degeneration may be a mode switching signal, or monitoring the system and starting radio communication to cover an area where the load is increased or a failure occurs.

Specifically, in a first mode (normal time), one radio base station out of a plurality of radio base stations constituting each radio area performs radio communication with a radio terminal in a first radio area using a first partial frequency band selected from a predetermined frequency band.

In a second mode (time of failure), a radio unit which performs radio communication with a radio terminal in a second radio area using a second partial frequency band selected from the above mentioned predetermined frequency band, and also which performs radio communication with a radio terminal in a third radio area using a third partial frequency band, which is different from the second partial frequency band, selected from the predetermined frequency band, is provided. The second partial frequency band is narrower than the first partial frequency band, and the third radio area is a radio area which includes at least the outside of the second radio area.

According to this embodiment, a partial frequency band is selected from a frequency band which is narrower than the first partial frequency band in the second mode, so more frequency band remains. And this extra space can be used for selecting the third partial frequency band. The radio area where radio communication is performed using the third partial frequency band in the second mode is wider than that of the first mode, so radio communication can be performed in the radio area outside the first radio area, therefore this radio area can have a redundant function of the adjacent radio base station.

Figure 7A:
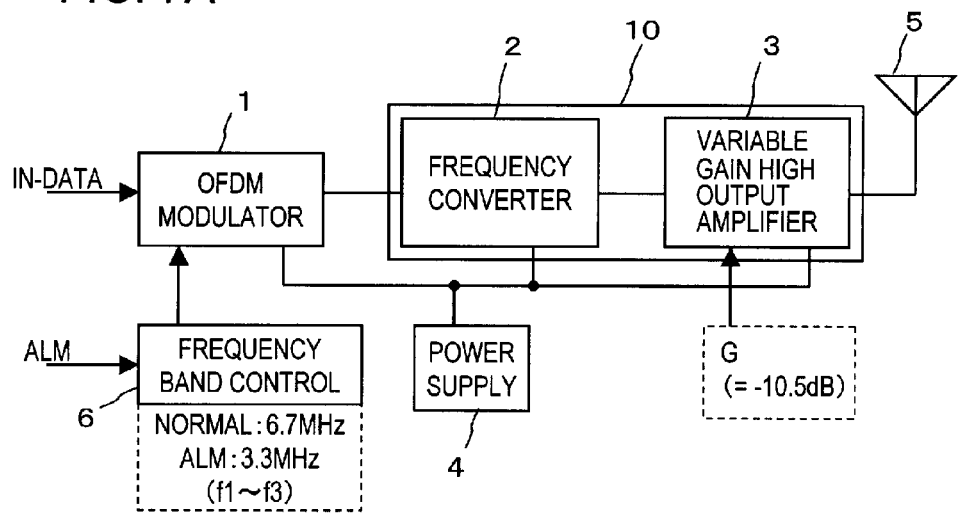
FIG. 7A is a diagram illustrating configuration examples of the radio base stations which perform controls corresponding to FIG. 6A.
Figure 7B:
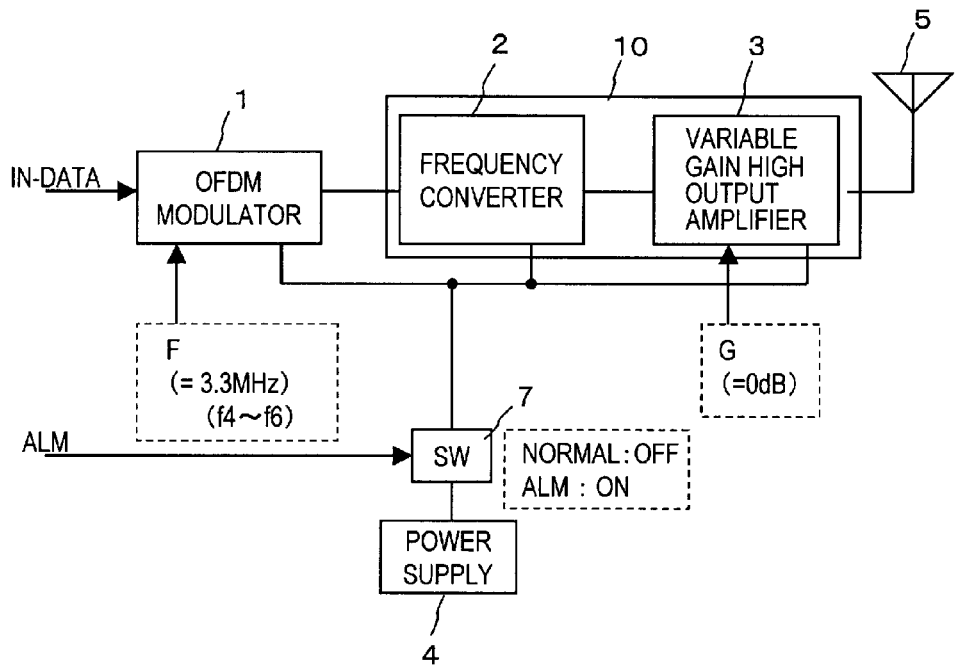
FIG. 7B is a diagram illustrating configuration examples of the radio base stations which perform controls corresponding to FIG. 6B.

FIG. 7A and FIG. 7B are diagrams illustrating configuration examples of the radio base stations which perform controls corresponding to FIG. 6A and FIG. 6B.

Specifically, FIG. 7A is a block diagram illustrating a transmission device which is commonly used by the active radio base stations excluding omni stations which cover the failed small zone. FIG. 7B is a block diagram illustrating backup radio base stations $161b$ and $16nb$ of the omni stations.

In both radio base stations, input data (IN-DATA) is OFDM-modulated by an OFDM modulator 1. At this time, a frequency band to be used is set in the OFDM modulator 1. Output of the OFDM modulator 1 is input to a radio unit 10. In the radio communication unit 10, input from the OFDM modulator 1 is converted into a radio frequency by a frequency converter 2, and power thereof is amplified by a variable gain high output amplifier 3, and is transmitted from an antenna 5. At this time, power is supplied to each unit by a power supply 4.

In normal operation, frequency bands f1, f2 and f3 are allocated in the OFDM modulator 1 so as to have a 6.7 MHz band respectively for the active radio base stations $161a$ to $16na$. The gain in the variable gain high output amplifier 3 at this time is controlled to be −10.5 dB corresponding to a small zone.

Therefore the respective frequency bands f1, f2 and f3 from the active radio base stations $161a$ to $16na$ are controlled and allocated so as not to be the same between adjacent stations.

In this case, in the configuration of the backup radio base stations $161b$ and $16nb$ equipped in the omni stations shown in FIG. 7B, a switch 7 is added, and the switch 7 is set to OFF since the alarm signal ALM, which is sent from the access service network 121 based on control of the network monitoring device 130, does not exist.

Since no power is supplied from the power supply 4 in this case, the backup radio base stations $161b$ and $16nb$ are not operated, and radio waves for the large zones are not radiated. In other words, in normal operation, only the small zones described in FIG. 4A are used.

Now a case when any of the active radio base stations fail is considered.

In this case, the network monitoring device 130 detects a failure of the active radio base station, and detects an omni station corresponding to a large zone that can cover the small zone corresponding to the failed active radio base station, with reference to the table in the network monitoring device 130 described above.

In the example shown in FIG. 5, the failed small zone X can be covered by the large zones A and B.

Hence the network monitoring device 130 sends an alarm signal ALM to the backup radio base station of the corresponding omni station via the access service network 121. In the corresponding backup radio base station, the switch 7 is turned ON, and power is supplied from the power supply 4 to each unit of the backup radio base station, as shown in FIG. 7B.

In this case, a 20 MHz band is divided into six frequency bands: f1, f2, f3, f4, f5 and f6, for the omni stations, and each band is set to 3.3 MHz.

The frequency bands f1, f2 and f3 are set for the active radio base stations of the omni stations corresponding to the large zones A and B, and f4, f5 and f6 are set for the backup radio base stations.

Therefore for the frequencies of the OFDM modulators 1 of the backup radio base stations corresponding to the two large zones A and B, the frequencies f4 and f5 out of f4, f5 and f6 are set so as to correspond to FIG. 6. Since the gain of the variable gain high output amplifier 3 of each backup radio base station is set to 0 dB, high frequency power corresponding to the large zones can be output from the antenna 5.

Figure 8:
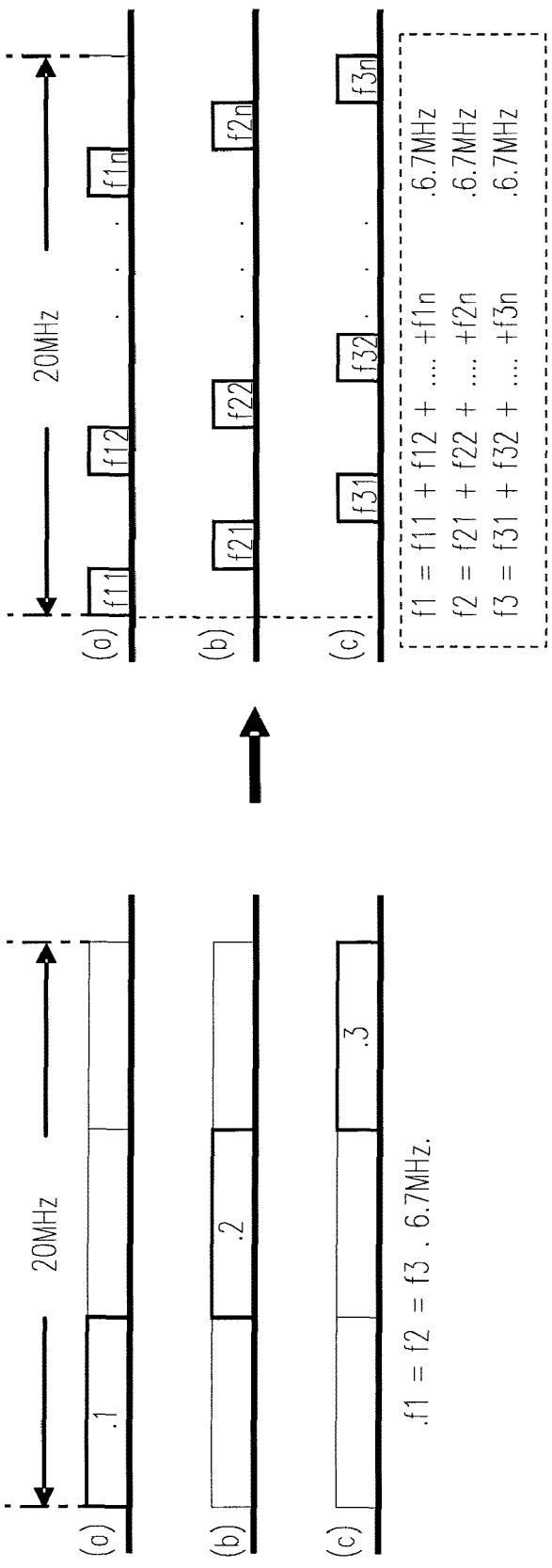
FIG. 8 illustrates frequency interleave.

Here in (a), (b) and (c) of FIG. 6A, the frequency allocation arrangement of the active radio stations to which the frequencies f1, f2 and f3 are allocated are shown such that the frequencies f1, f2 and f3 are continuous for the 6.7 MHz band respectively. Actually, however, frequency interleave is performed. In (8) of FIG. 8 illustrating this frequency interleave, a plurality of periodic small frequency bands, as shown in (b) of FIG. 8, are used for the frequency arrangement of (a), (b) and (c) of FIG. 6A.

In other words, f11, f12, ... f1n are obtained by periodically dividing f1: $f1 = f11 + f12 + \ldots f1n \approx 6.7$ MHz. In the same manner, f2 and f3 are as follows: $f2 = f21 + f22 + \ldots + f2n \approx 6.7$ MHz, and $f1 = f31 + f32 + \ldots + f3n \approx 6.7$ MHz.

In this way, frequency interleave is performed to prevent a complete error which could occur due to the influence of fading when a signal is demodulated using a continuous frequency.

In the other embodiment to be described herein below as well, frequency allocation arrangement is shown using a continuous frequency, as shown in FIG. 6A and FIG. 6B, but frequency interleave may be used in the same way.

Figure 9:
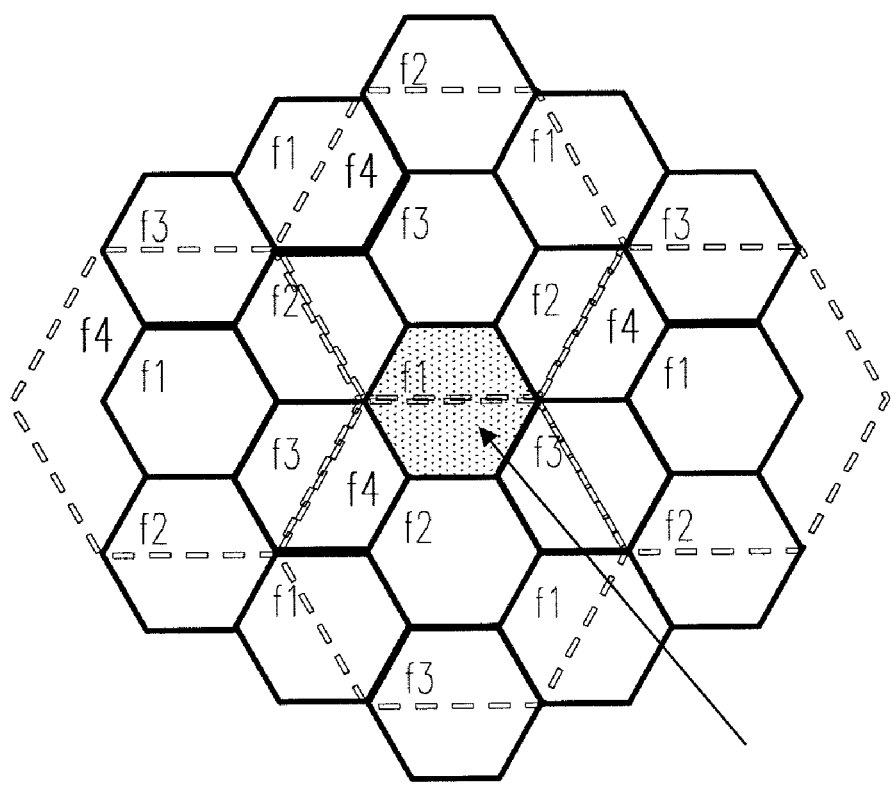
FIG. 9 is a diagram illustrating a concept of station disposition according to the second embodiment of the present invention.

FIG. 9 is a diagram illustrating a concept of station disposition according to the second embodiment of the present invention. In FIG. 9, an omni station is repeatedly disposed every three zones, with frequency bands f1, f2 and f3 respectively. And one omni station is overlaying every four sites with frequency band f4.

Now it is assumed that in the WiMAX system, the frequency band which can be used is 20 MHz, and the total power which can be output is 20 W.

Figure 10A:
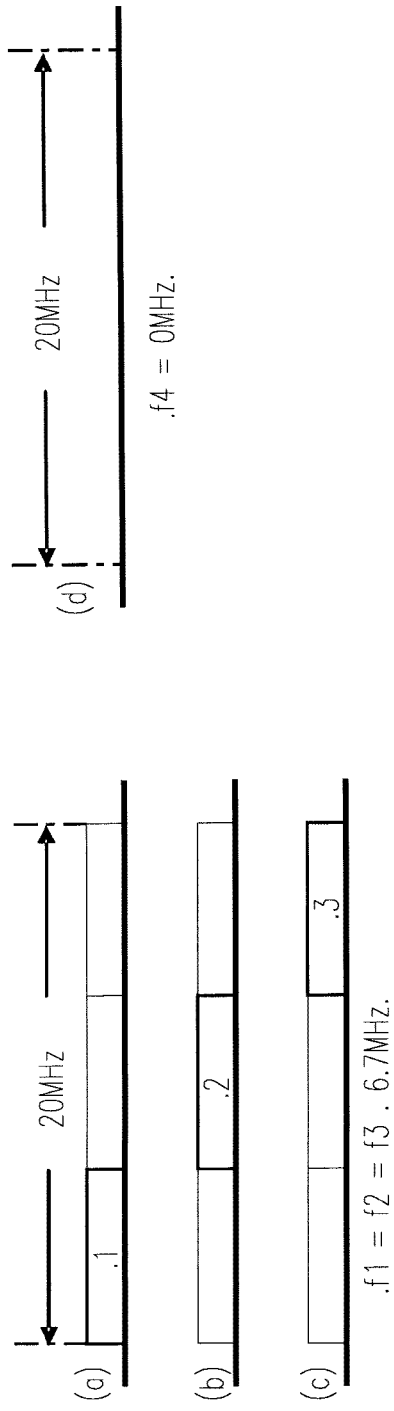
FIG. 10A is a diagram illustrating a frequency allocation in normal operation according to the second embodiment.
Figure 10B:
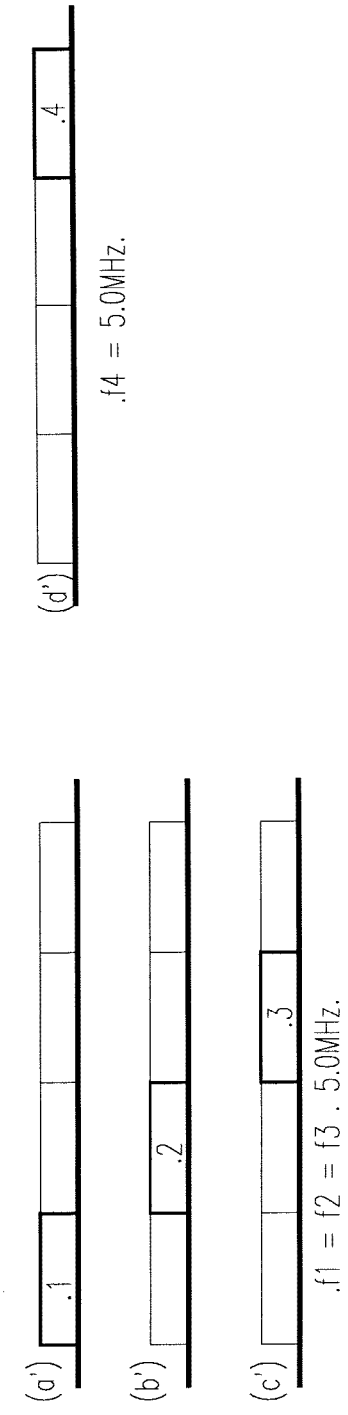
FIG. 10B is a diagram illustrating frequency allocation in the case where a frequency f4 is allocated to the overlaying station, if a station fail, in the second embodiment.

FIG. 10A and FIG. 10B are diagrams illustrating frequency allocation corresponding to the second embodiment. FIG. 10A is a diagram illustrating a frequency allocation in normal operation. In the omni station which is disposed repeatedly every three zones, frequency bands f1, f2 and f3 are evenly allocated. It is assumed that this frequency band width is "1". As FIG. 9 shows, one station which overlays every four sites requires only a capacity sufficient for two stations to cover one failed station, so "1" is allocated for the required band width f4. Therefore the frequency band width to be allocated to f1, f2 and f3 is 20 MHz/(3×1+1)≈5.0 MHz, and the frequency band width to be allocated to f4 is 5.0 MHz.

Here the frequencies are allocated only when a station fails, just like the first embodiment. Then it is unnecessary to secure frequencies in normal operation, and frequency utilization efficiency can be improved.

If a station fails, a frequency f4 is allocated to the overlaying station, as shown in FIG. 10B. In normal operation, 6.7 MHz (=20 MHz/3) is allocated to f1, f2 and f3 (FIG. 10A, (a) to (c)), and when a failure occurs, 5.0 MHz is allocated to f1, f2 and f3, and 5.0 MHz is allocated to f4 only for the corresponding cell (FIG. 10A (a) to (d)). Therefore efficiency is 1.63 times (≈6.7/4.1) better.

It is assumed that the stations to which the frequency bands f1 to f3 are allocated have a high subscriber density, and are disposed with a cell radius which is ½ of the radio radiation distance. If the radio propagation loss is in proportion to the $3.5^{th}$ power of the distance, then the output power of the radio base station becomes −10.5 dB (=35×LOG(½)) lower than the maximum output.

The station to which the frequency f4 is allocated must have a radius that is double that of the cells to which the frequencies f1 to f3 are allocated, and the maximum output is radiated. If the cell corresponding to the small zone X in FIG. 9 fails, only half the area can be covered.

Figure 11A:
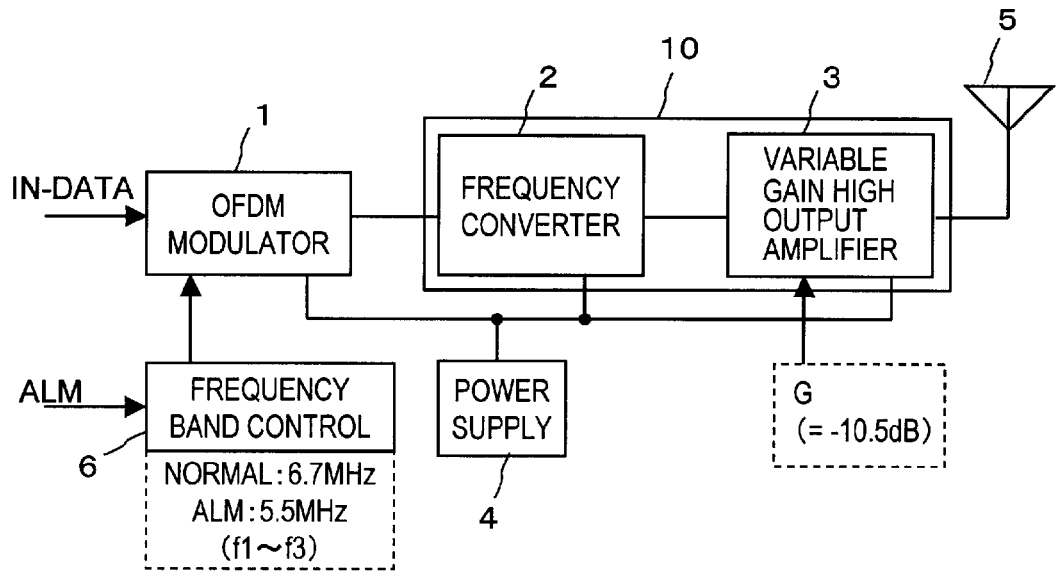
FIG. 11A is a diagram illustrating configuration examples of the radio base stations which perform control corresponding to FIG. 10A.
Figure 11B:
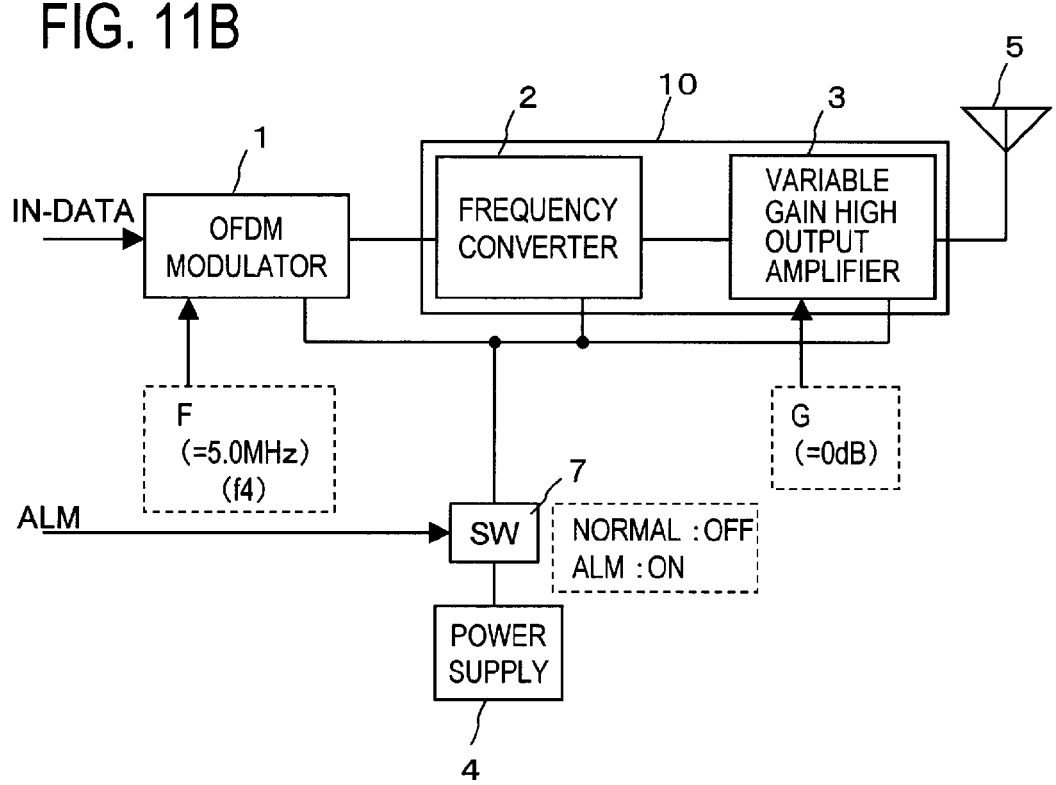
FIG. 11B is a diagram illustrating configuration examples of the radio base stations which perform control corresponding to FIG. 10B.

FIG. 11A and FIG. 11B are diagrams illustrating configuration examples of the radio base stations which perform control corresponding to FIG. 10A and FIG. 10B.

Specifically, FIG. 11A is a block diagram illustrating a transmission device which is commonly used by the active radio base stations excluding the omni stations which cover the failed small zone. FIG. 11B is a block diagram of backup radio base stations 161b and 16nb of the omni stations which cover the failed small zone.

In both radio stations, input data (IN-DATA) is OFDM-modulated by the OFDM modulator 1. At this time, a frequency band to be used is set in the OFDM modulator 1. Output of the OFDM modulator 1 is converted into a radio frequency by a frequency converter 2, and power thereof is amplified by a variable gain high output amplifier 3, and is transmitted from an antenna 5. At this time, power is supplied to each unit by a power supply 4.

In normal operation, frequency bands f1, f2 and f3 are allocated in the OFDM modulator 1 so as to have a 6.7 MHz band respectively for the active radio base stations 161a to 16na. The gain in the variable gain high output amplifier 3 at this time is controlled to be −10.5 dB corresponding to a small zone.

Therefore the respective frequency bands f1, f2 and f3 from the active radio base stations 161a to 16na are repeatedly allocated so as not to be the same between adjacent stations.

In this case, in the configuration of the backup radio base stations 161b to 16nb equipped in the omni stations shown in FIG. 11B, a switch 7 is added, and the switch 7 is set to OFF since the alarm signal ALM, which is sent from the access service network 121 based on the control of the network monitoring device 130, does not exist.

Since the power is not supplied from the power supply 4 in this case, the backup radio base stations 161b and 16nb are not operated, and radio waves for large zones are not radiated. In other words, in normal operation, only small zones described in FIG. 10A are used.

Now a case when any of the active radio base stations fails is considered.

In this case, the network monitoring device 130 detects a failure of an active radio station, and detects an omni station corresponding to a large zone that can cover the small zone corresponding to the failed active radio base station, with reference to the table in the network monitoring device 130 described above.

In the example shown in FIG. 9, half of the failed small zone X can be covered by the frequency band f4.

Hence the network monitoring device 130 sends an alarm signal ALM to the backup radio base station of the corresponding omni station via the access service network 121. In the corresponding backup radio base station, the switch 7 is turned ON, and power is supplied from the power supply 4 to each unit of the back radio base station, as shown in FIG. 11B.

In this case, a 20 MHz band is divided into four frequency bands f1, f2, f3 and f4 for the omni stations, and each band is set to 5.0 MHz.

The frequency bands f1, f2 and f3 are set for the active radio base stations of the omni stations corresponding to the large zone, and f4 is set for the backup radio base station.

Therefore for the frequency of the OFDM modulator 1 of the backup radio base station corresponding to the large zone, f4 is set as shown in FIG. 10B. Since the gain of the variable gain high output amplifier 3 of this backup radio base station is set to 0 dB, high frequency power corresponding to the large zone can be output from the antenna 5.

Figure 12:
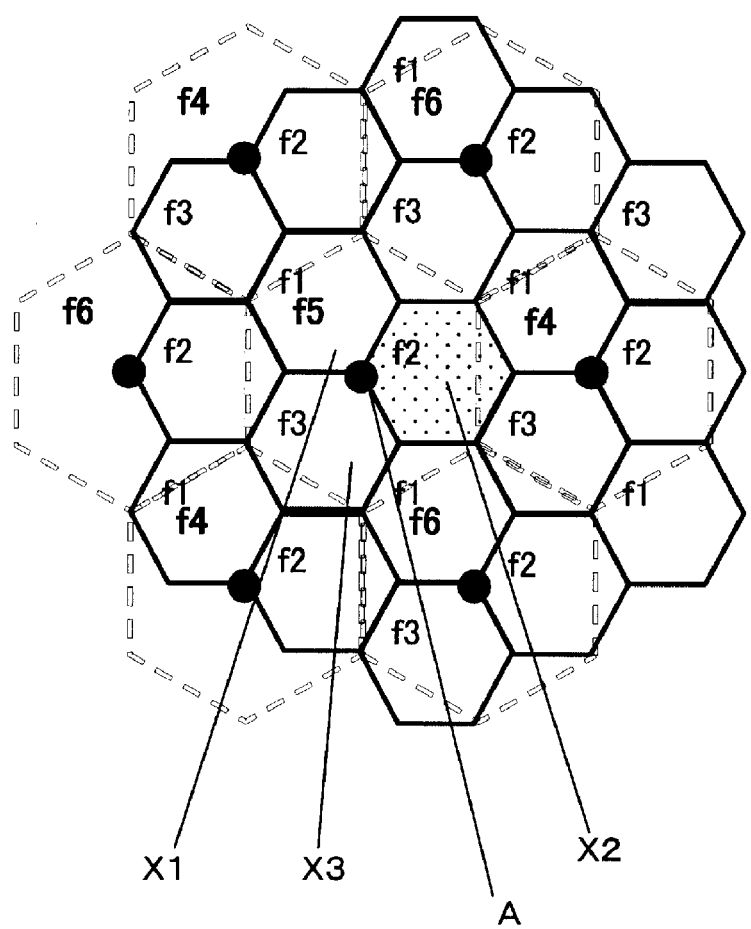
FIG. 12 is a diagram illustrating a concept of station disposition according to the third embodiment of the present invention.

FIG. 12 is a diagram illustrating a concept of station disposition according to the third embodiment of the present invention.

FIG. 12 shows an example of the WiMAX system network, where using radio base stations having a three-sector antenna, that is one antenna to which different frequencies having three different directivities are allocated, one radio zone is repeatedly disposed (equally allocating frequency bands f1, f2 and f3 in each sector) so that coverage holes (uncovered areas) are not generated.

For example, in a radio station A in FIG. 12, three sectors X1, X2 and X3 constructed by sector antennas constitute one radio zone respectively, where frequencies f1, f2 and f3 are used.

Also in FIG. 12, one omni device is overlaid every four sites if subscriber density is high, and stations are disposed with a coverage narrower than the radio radiation range. Different frequencies f4, f5 and f6 are allocated to the overlaying radio base stations so as to adjust the output power. Therefore coverage holes can be compensated for even if a station disposed repeatedly every three zones fails. Overlaying stations are always operating.

Just like the previous embodiment, it is assumed that the frequency band that can be used in FIG. 12 is 20 MHz, and the output power is a total of 20 W.

The frequency and output power allocation method in this case will now be described. In each three-sector station (e.g. position indicated by "A" in FIG. 12), an omni device is disposed. The omni station is disposed repeatedly every three zones, so interference from other cells can be decreased.

In this case, the radius "r" of the omni station is r=(√3)/2× R, where R is a radius of the three-sector station. A frequency band to cover one sector of the three-sector station is allocated to the omni station. Therefore f1 to f6 all become the same value, where 3.3 MHz (=20 MHz/6) is allocated respectively.

The frequency band width per radio base station is 13.2 MHz (=3.3×3+3.3). The output power of f4 to f6 can be about 2 dB (=35×LOG((√3)/2) lower than the output power of the three-sector device. The antenna gain of the omni station is about 5 dB lower than the antenna gain of the three-sector device, so 40 W (3 dB higher than normal) is sufficient for the output power of the omni station. The antenna of the omni station may be increased so that gain is increased. Even if a corresponding cell fails due to failure of the sector X1 in FIG. 12, the cell can be covered by the signals from the two stations, f4 and f5.

The configuration of the present embodiment will be described based on this principle.

Figure 13A:
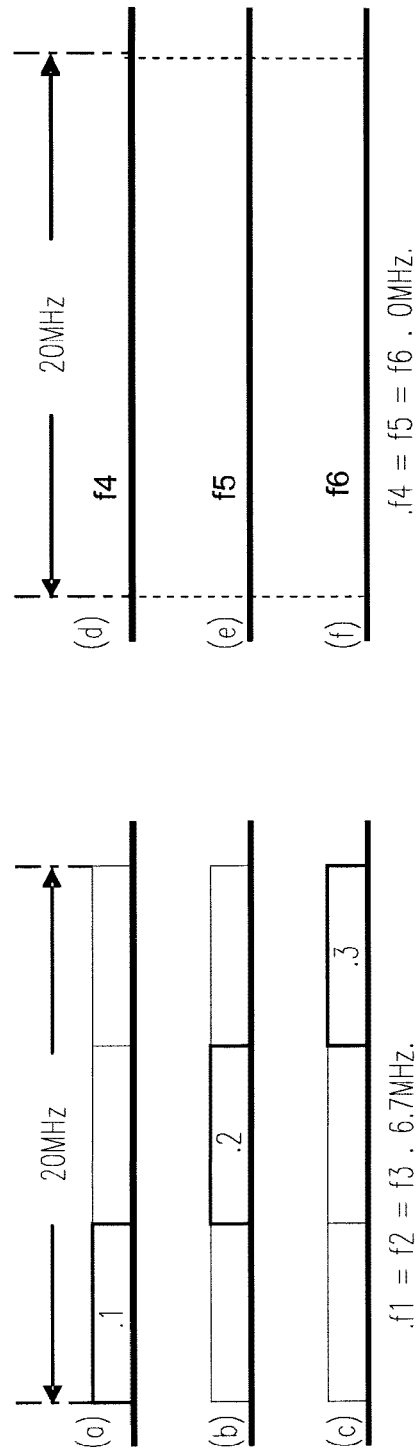
FIG. 13A is a diagram illustrating a frequency allocation in normal operation according to the third embodiment.
Figure 13B:
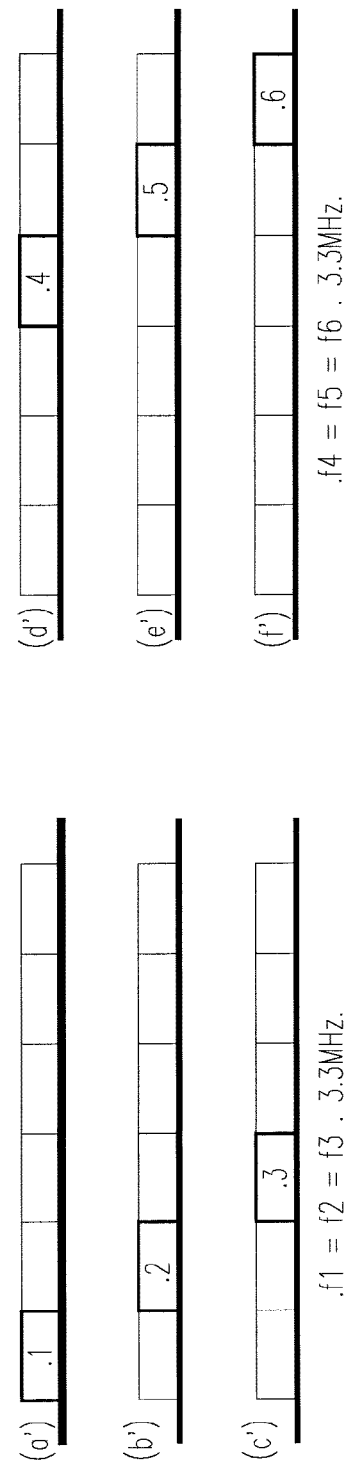
FIG. 13B is a diagram illustrating frequency allocation in the case where frequencies are allocated to the overlaying station, if a station fail, in the third embodiment.

FIG. 13A and FIG. 13B are diagrams illustrating frequency allocation according to the third embodiment.

FIG. 13A is a diagram illustrating a frequency allocation in normal operation, where frequency bands f1, f2 and f3 are evenly allocated to the three sectors respectively (FIG. 13A (a), (b) and (c)). Since allocation of the frequencies f4, f5 and f6 for overlaying is not required in normal operation in each omni station which is disposed every four sites (FIG. 13A (a), (b) and (c)), frequency utilization efficiency can be improved, as mentioned above.

If a failure occurs, the frequencies f4, f5 and f6 for overlaying are allocated to each omni station, which is disposed every four sites, as shown in FIG. 13B (FIG. 13B (d'), (e') (f')).

In other words, in normal operation, 6.7 MHz (=20 MHz/3) is allocated to f1 to f3, and only when a failure occurs 3.3 MHz is allocated to f1 to f6, only for a corresponding cell. Therefore efficiency is 1.5 times (≈20/3.3×4) better.

Figure 14A:
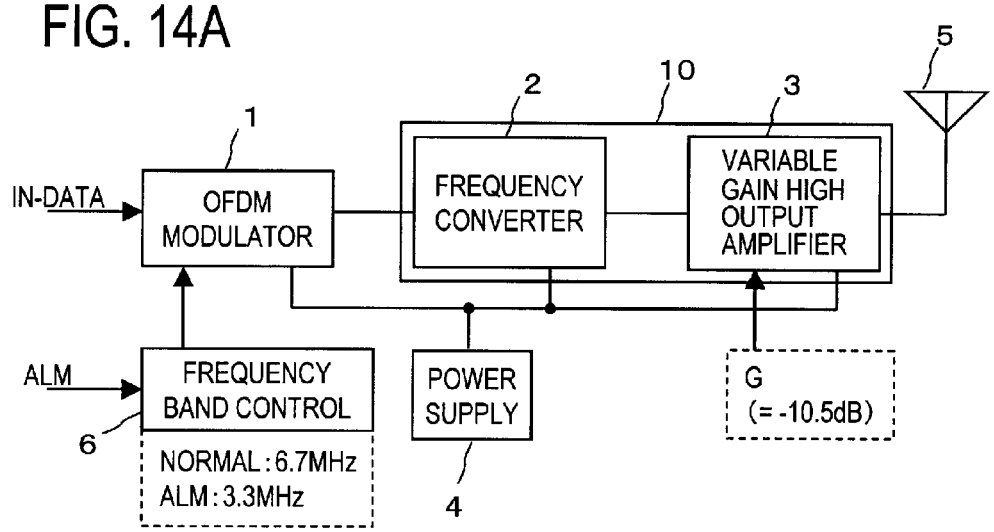
FIG. 14A is a diagram illustrating configuration examples of the radio base stations which perform control corresponding to FIG. 13A.
Figure 14B:
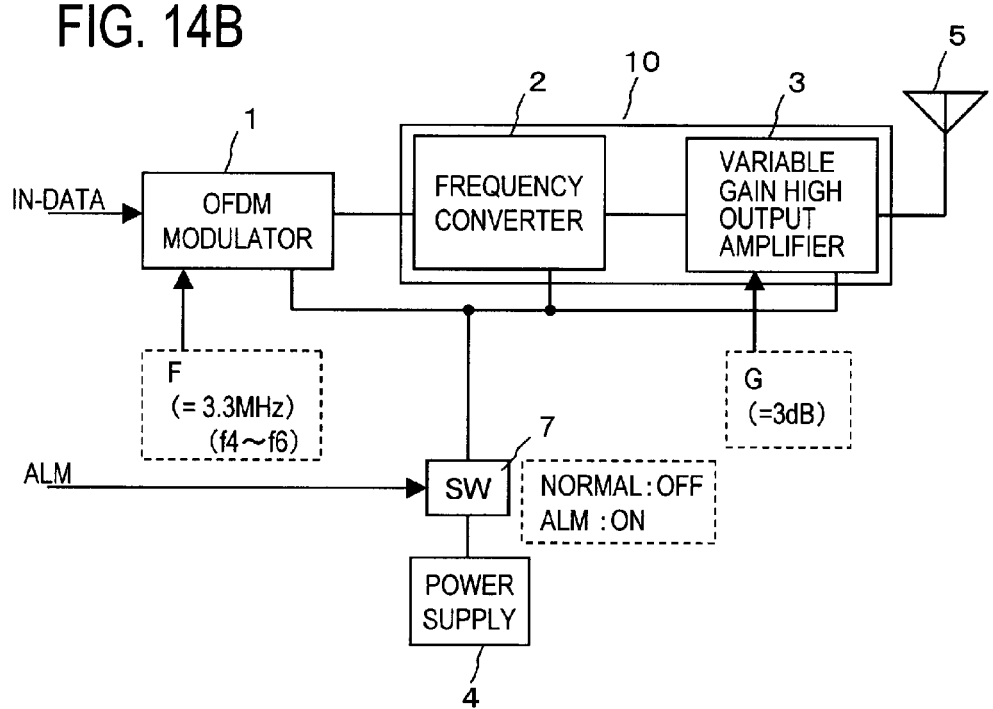
FIG. 14B is a diagram illustrating configuration examples of the radio base stations which perform control corresponding to FIG. 10B.

FIG. 14A and FIG. 14B are block diagrams illustrating a configuration example of a transmission side device of an active radio base station, and a block diagram illustrating a configuration example of a transmission side device of an overlaying radio base station according to the third embodiment.

The frequency band allocation is adjusted by the OFDM modulator 1, and the output power is adjusted by the variable gain high output amplifier 3, just like the above described embodiments.

The active radio base station is a three-sector device, and frequency band width 3.3 MHz is allocated to each sector. The overlaying backup radio base station is an omni device, where 3.3 MHz is allocated to the frequency bandwidth. Regardless the generation of a failure, the backup radio base stations are also operating constantly. So even if a failure occurs to one cell, no special control is necessary.

In normal operation, frequency band width 6.7 MHz is allocated as shown in FIG. 14A, and when an alarm signal ALM is received from the network monitoring device 130, the frequency band control unit 6 changes the frequency band width to 3.3 MHz. The overlaying backup radio base station allocates the frequency bandwidth 3.3 MHz in advance, as shown in FIG. 14B, but when an alarm signal ALM is received from the network monitoring device 130, the backup radio base station turns the switch 7 ON so as to supply the power from the power supply 4, and starts output. The radio base station assigns the overlaid frequency to a terminal located in the area where the failure occurred.

Figure 15:
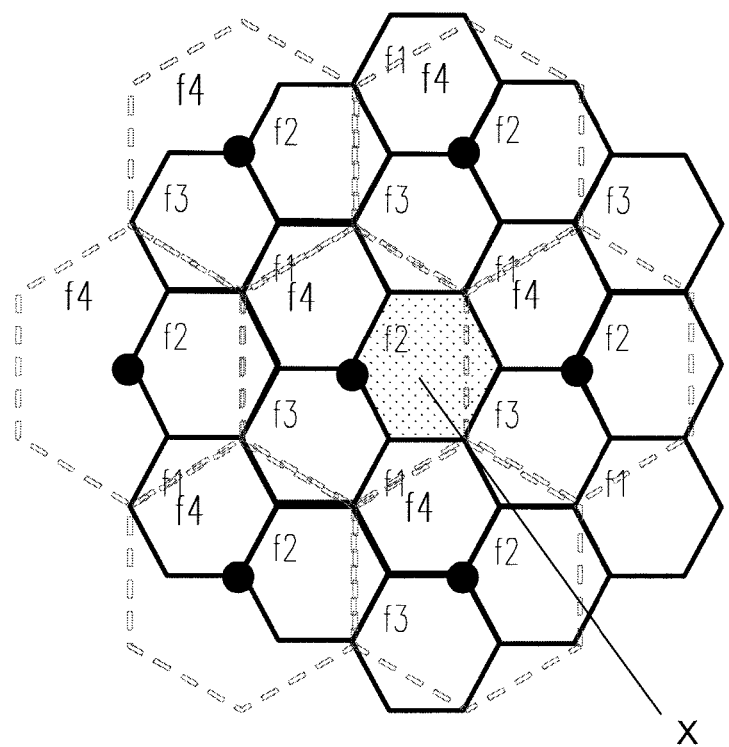
FIG. 15 is a diagram illustrating a concept of station disposition according to the fourth embodiment of the present invention.

FIG. 15 is a diagram illustrating a concept of station disposition according to the fourth embodiment of the present invention.

A three-sector radio base station is disposed repeatedly in each zone. Each omni station is overlaying each individual site. It is assumed that the frequency band that can be currently used is 20 MHz, and the output power is total of 20 W.

FIG. 16A and FIG. 16B are diagrams illustrating frequency allocation.

An omni station as a backup radio base station is disposed in each of the three-sector radio base stations (positions indicated by ● in FIG. 15), as shown in FIG. 15. By disposing an omni station repeatedly every three zones, interference from other cells can be decreased. In this case, the radius "r" of the omni station is r=(√3)/2×R where "R" is a radius of the three-sector radio base stations. A frequency band width that covers one sector of the three-sector station is allocated to the omni station. The failed station is covered by the frequency f4, although coverage is not sufficient here.

The frequency band width allocated to f1 to f3 is 20 MHz/4=5 MHz, and the frequency band width allocated to f4 is also 5 MHz. In other words, in normal operation, 6.7 MHz (=20 MHz/3) is allocated to f1 to f3 (FIG. 16A (a), (b), (c)), and when failure occurs, 5 MHz is allocated to f1 to f3 (FIG. 16B, (a'), (b'), (c')) respectively, and 5 MHz is also allocated to f4, only for a corresponding cell.

The output power of f4 can be about 2 dB (=35×LOG ((√3)/2) lower than the output power of the three-sector device. Since the antenna gain of the omni station is about 5 dB lower than the antenna gain of the three-sector device, it is sufficient if the output power of the omni station is 40 W (3 dB higher than normal). Another method is using a larger antenna with a higher gain for the omni station. If the cell X fails in FIG. 15, then the cell X can be roughly covered by a signal from one station of f4.

Figure 17A:
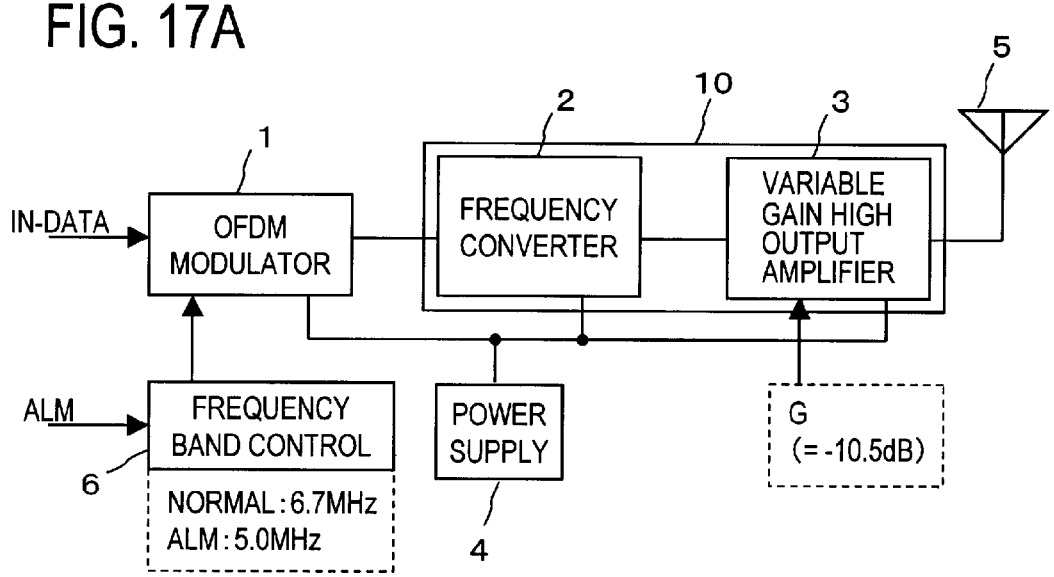
FIG. 17A is a diagram illustrating configuration examples of the radio base stations which perform control corresponding to FIG. 16A.
Figure 17B:
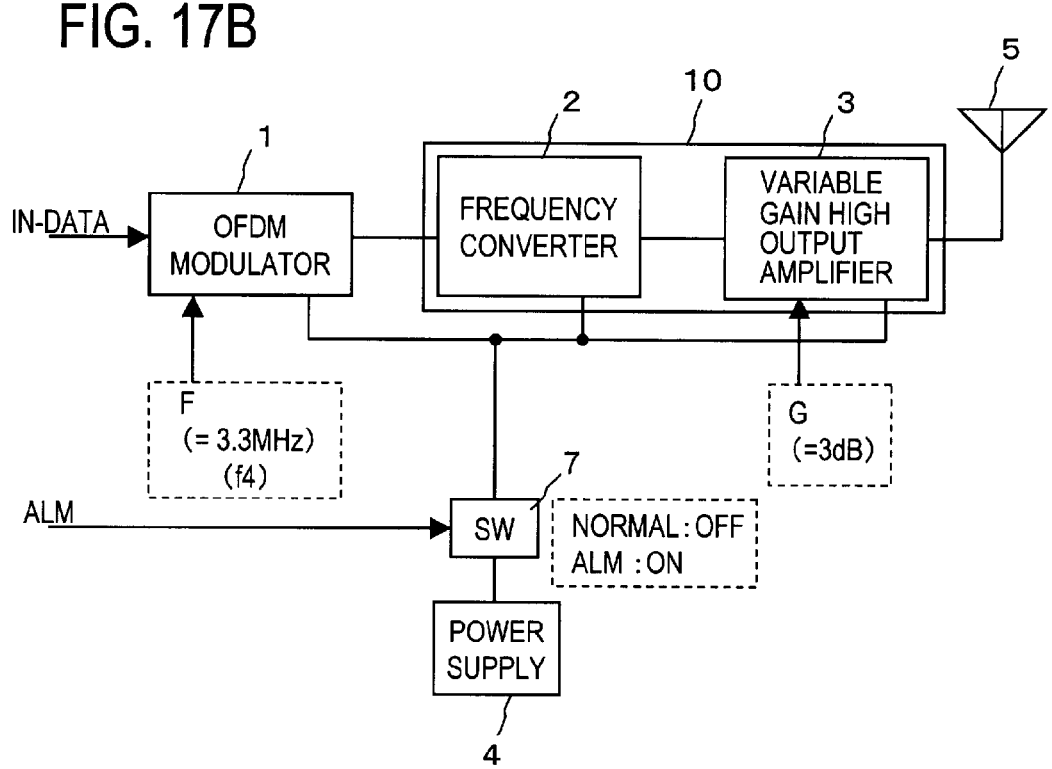
FIG. 17B is a diagram illustrating configuration examples of the radio base stations which perform control corresponding to FIG. 16B.

FIG. 17A and FIG. 17B are block diagrams illustrating a configuration example according to the third embodiment, which are described in FIG. 15, FIG. 16A and FIG. 16B.

FIG. 17A shows a configuration example of a transmission side device of an active radio base station, and FIG. 17B shows a configuration example of a transmission side device of a backup radio base station which becomes an overlaying radio base station. The frequency band allocation shown in FIG. 16A and FIG. 16B is adjusted by the OFDM modulator 1, and the output power is adjusted by the variable gain high output amplifier 3.

In FIG. 17A, the active radio base station is a three-sector device, and in one of the sectors, frequency bandwidth 6.7 MHz is allocated, and the gain of the variable gain high output amplifier 3 is controlled to be −10.5 dB. When an alarm signal ALM is received from the network monitoring device 130, the frequency bandwidth of the OFDM modulator 1 is changed to 5.0 MHz.

In FIG. 17B, the overlaying backup radio base station allocates the frequency bandwidth 3.3 MHz in advance, but in normal operation, the switch 7 is OFF, and power is not supplied at all from the power supply 4. When an alarm signal ALM is received from the network monitoring device 130, the backup radio base station turns the switch 7 ON so as to supply the power from the power supply 4, and sets the frequency bandwidth of the OFDM modulator 1 to 3.3 MHz, and sets the gain of the variable gain high output amplifier 3 to 3 dB, and starts outputting the signal.

The frequency of the overlaying station is assigned from the radio base station to a terminal located in an area where the failure occurred.

Figure 18:
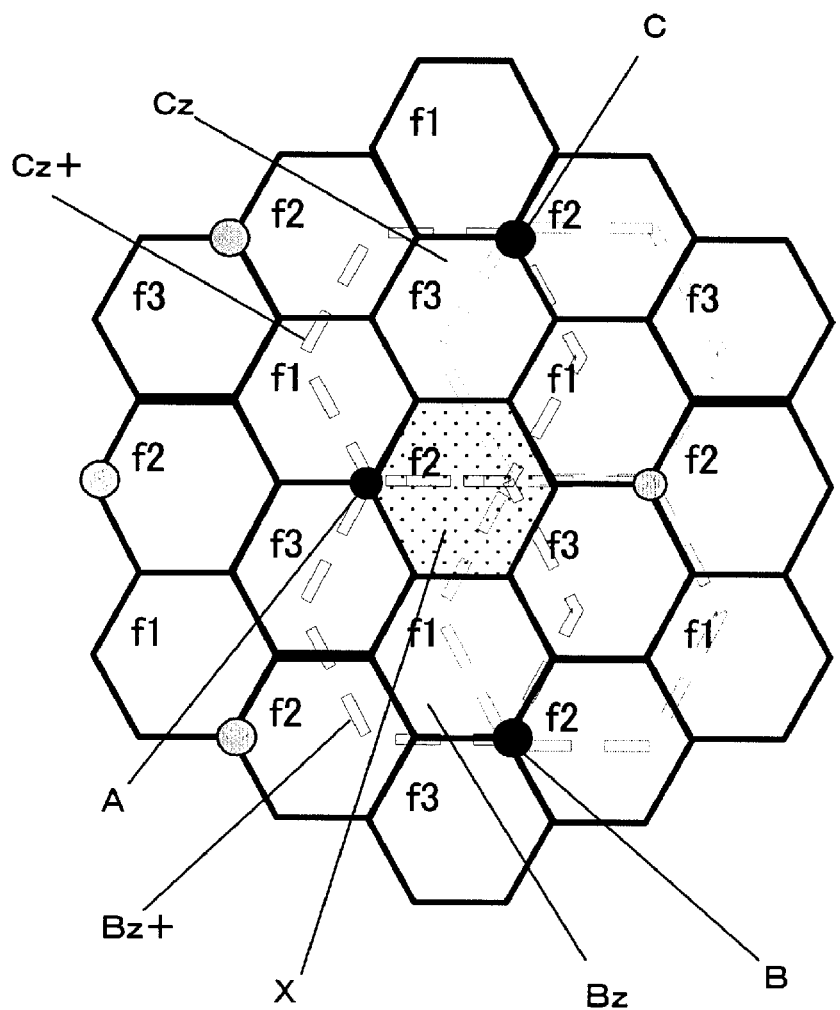
FIG. 18 is a diagram illustrating a concept of station disposition according to the fifth embodiment of the present invention.
Figure 19:
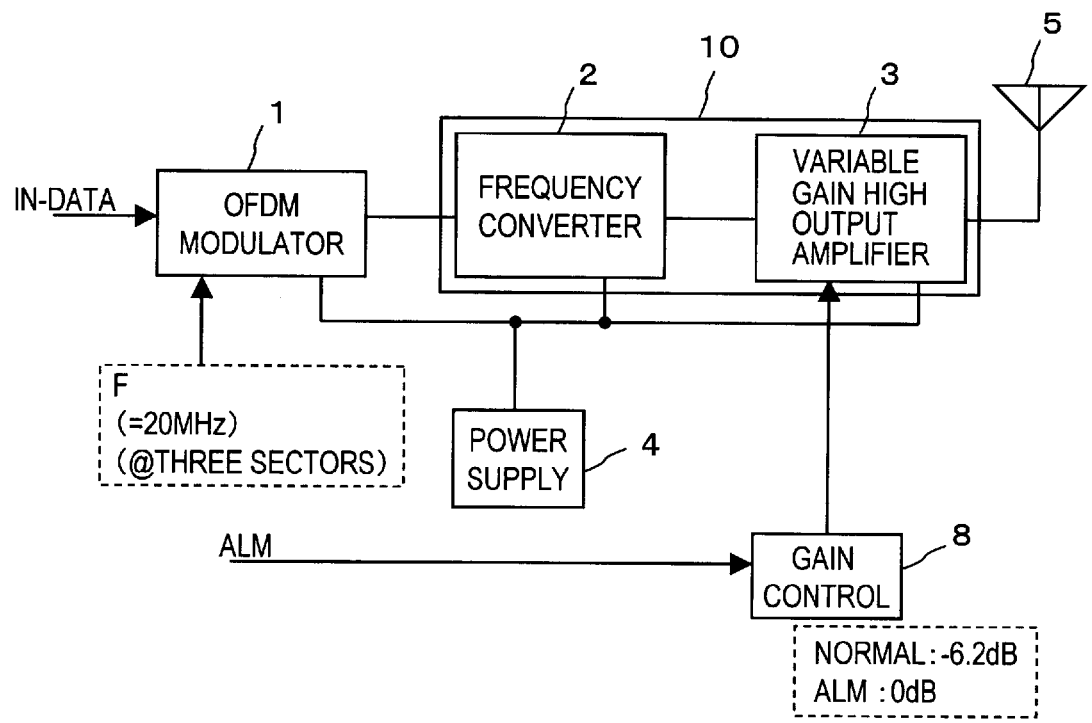
FIG. 19 is a block diagram illustrating a configuration example of the three-sector radio base station corresponding to the fifth embodiment.

FIG. 18 is a diagram illustrating a concept of station disposition according to the fifth embodiment of the present invention. In this example, a three-sector radio base station is disposed repeatedly in each zone. It is assumed that the frequency band that can be used currently is 20 MHz, and output power is a total of 20 W. FIG. 19 is a block diagram illustrating a configuration example of the three-sector radio base station corresponding to the fifth embodiment.

In FIG. 18, the three-sector radio base station is disposed repeatedly in each zone, so that no coverage holes (uncovered areas) are not generated (position indicated by 0 in FIG. 18). It is assumed that subscriber density is high, and the radio base stations are disposed with a coverage which is ⅔ of the radio radiation range. It is sufficient that the output power of the radio base station is −6.2 dB (=35×LOG(⅔)) lower than the maximum output power.

If the cell X at the position ● A, which is one of the three-sector radio base stations, fails, the output power of two three-sector radio base stations at the positions ● B and ● C is increased to 20 w, then the coverage area spreads (Az and Bz in FIG. 18), and the area corresponding to the sector X can be covered.

For example, the failed sector X is covered by the expanded zone Bz+ of the f1 sector Bz of the radio base station at the position ● B below the sector X, and the expanded zone Cz+ of the f3 sector Cz of the radio base station at the position ● C above the sector X.

However, the coverages of the two sectors Bz and Cz expand (Bz+, Cz+), but the accommodated subscribers are decreased to ⅔ respectively, that is, ⅓ of the subscribers of the sector X are accommodated.

In FIG. 19, which is a block diagram illustrating a configuration of the three-sector radio base station at the transmission side, the OFDM modulator 1 adjusts the frequency band allocation, and the variable gain high output amplifier 3 adjusts the output power. The frequency bandwidth 20 MHz is allocated to the three-sector radio base station. The gain of the variable gain high output amplifier 3 is set to −6.2 dB in advance by the gain control unit 8 in normal operation. And when an alarm signal is received from the network monitoring device 130, the gain is changed to 0 dB. No setting change is required for a terminal located in the area where the failure occurred.

Needless to say, the description of the above embodiments do not limit the application of the present invention, but covers equivalents thereof. Embodiments having the characteristics and effects of the present invention are included in the scope of the claims of the present application.

The invention claimed is:

1. A radio communication system comprising:
a plurality of radio base stations each of which has a predetermined number of sectors and is disposed so that a radio zone covered by each sector does not overlap another radio zone, each of the plurality of radio base stations further comprising a backup radio base station, wherein
in normal operation, different frequency bands are generated by dividing a predetermined frequency bandwidth by the predetermined number of sectors, and the generated different frequency bands are set for each of the predetermined number of sectors,
when a failure occurs, different frequency bands are generated by dividing the predetermined frequency bandwidth by a total number of the predetermined number of sectors and a predetermined number of radio base stations among the plurality of radio base stations, and are allocated to the predetermined number of sectors and a backup radio base station of a radio base station having a failed sector, and
the output power of the backup radio base station of the radio base station having the failed sector is adjusted so as to overlay the radio zone covered by the failed sector.

2. A radio communication system comprising:
a plurality of radio base stations each of which has a predetermined number of sectors and is disposed so that a radio zone covered by each sector does not overlap another radio zone, each of the plurality of radio base stations further comprising a backup radio base station, wherein
in normal operation, different frequency bands are generated by dividing a predetermined frequency bandwidth by the predetermined number of sectors, and the generated different frequency bands are set for each of the predetermined number of sectors,
when a failure occurs, different frequency bands are generated by dividing the predetermined frequency bandwidth by a total number derived by adding one to the predetermined number of sectors, and the generated different frequency bands are allocated to the predetermined number of sectors and a backup radio base station of the radio base station having a failed sector, and
the output power of the backup radio base station of the radio base station having the failed sector is adjusted so as to overlay the radio zone covered by the failed sector.

3. A radio communication system comprising:
a plurality of radio base stations each of which has a predetermined number of sectors and is disposed so that a radio zone covered by each sector does not overlap another radio zone, each of the plurality of radio base stations further comprising a backup radio base station, wherein
in normal operation, different frequency bands are generated by dividing a predetermined frequency bandwidth by the predetermined number of sectors, and the generated different frequency bands are set for each of the predetermined number of sectors, and
when a failure occurs, the output power of the backup radio base station of a radio base station corresponding to a sector adjacent to a failed sector is adjusted so as to overlay the radio zone covered by the failed sector.

4. A radio base station of a plurality of radio base stations which perform radio communication using frequencies not mutually overlapping and belonging to a certain frequency band, and are disposed in a radio communication system having a radio base station group constituting radio zones adjacent to each other, comprising:
a modulator configured to modulate data and set a frequency band to the data; and
a communicator, in which when the frequency band which is not used for the plurality of radio base stations belonging to the radio base station group is increased in the certain frequency band due to a decrease of frequency bands used by one or a plurality of radio base stations out of the radio base stations, the use of the frequency band belonging to the increased frequency band is started after the decrease of frequency bands, and radio communication is performed in the radio communication system.

5. A radio communication system comprising:
a plurality of radio base stations; and
backup radio base stations, each being provided at a site, which corresponds to positions of a predetermined number of radio base stations among the plurality of radio base stations, wherein
in normal operation,
a predetermined frequency bandwidth is divided by the number of a first plurality of frequency bandwidths, and respective divided different frequency bandwidths are allocated to the plurality of radio base stations so as not to overlap between adjacent radio base stations, and
when a failure occurs,
the predetermined frequency bandwidth is divided by a total number of the number of the first plurality of frequency bandwidths and the number of a second plurality of frequency bandwidths allocated to backup radio base stations positioned at a predetermined number of sites around positions covering a radio zone of the failure radio base station so that radio zones are not to overlap between the sites, and the respective divided different frequency bandwidths correspond to the first plurality of bandwidths and the second plurality of frequency bandwidths, and wherein output powers of the backup radio base stations provided at a predetermined number of sites located around a position covering the radio zone of the failure radio base station are adjusted so as to overlay the radio zone of the failure radio base station.

6. A radio communication system comprising:

a plurality of radio base stations; and backup radio base stations, each being provided at a site, which corresponds to positions for a predetermined number of radio base stations among the plurality of radio base stations, wherein in a normal condition, a predetermined frequency bandwidth is divided by the number of a plurality of frequency bandwidths, and respective divided different frequency bandwidths are allocated repeatedly to the plurality of radio base stations so as not to overlap between adjacent radio base stations, and when a failure occurs, the predetermined frequency bandwidth is divided by the number derived by adding one to the number of the plurality of frequency bandwidths, and the respective divided different frequency bandwidths are allocated to the plurality of radio base stations and backup radio base stations provided at one or two sites located around at positions covering a radio zone of the fault radio base station, and the output power of the backup radio base stations provided at the one or two sites is adjusted so as to cover the radio zone of the failure radio base station.

* * * * *